United States Patent [19]

Huillet et al.

[11] 4,003,726

[45] Jan. 18, 1977

[54] CLEANING OF PARTICULATE OR MIST ELIMINATING APPARATUS WITH $SO_2$

[75] Inventors: F. Dale Huillet, Snohomish; L. Michael Minshull, Everett, both of Wash.

[73] Assignee: Scott Paper Company, Philadelphia, Pa.

[22] Filed: Dec. 10, 1975

[21] Appl. No.: 639,226

[52] U.S. Cl. ............ 55/90; 55/96; 134/2; 134/27
[51] Int. Cl.² ................................... B01D 46/04
[58] Field of Search ............ 55/90, 96, 73; 134/2, 134/3, 27; 210/32, 79

[56] References Cited
UNITED STATES PATENTS

| | | | |
|---|---|---|---|
| 2,513,174 | 6/1950 | Hess | 55/96 |
| 3,403,498 | 10/1968 | Pasha | 55/96 X |
| 3,763,631 | 10/1973 | Horn et al. | 55/96 |
| 3,908,680 | 9/1975 | Krezanoski | 134/27 |

*Primary Examiner*—Charles N. Hart
*Assistant Examiner*—Robert H. Spitzer
*Attorney, Agent, or Firm*—Nicholas J. DeBenedictis; John W. Kane, Jr.

[57] ABSTRACT

Fiber containing devices for eliminating mist and/or particulate matter from flue gases may become plugged with carbonaceous and/or inorganic deposits or particulate matter. Cleaning of such mist eliminators to remove the plugging deposits is accomplished by the present invention by employing a two-step cleaning process. The process involves soaking the plugged fiber beds of the mist eliminator in hot acidified potassium permanganate ($KMnO_4$) followed by treating the beds with gaseous sulfur dioxide.

7 Claims, No Drawings

CLEANING OF PARTICULATE OR MIST ELIMINATING APPARATUS WITH $SO_2$

BACKGROUND OF THE INVENTION

1. Field of the Invention

The present invention concerns cleaning plugging deposits from packed fiber bed type mist eliminators particularly mist eliminators used to process combustion flue gases.

2. Description of the Prior Art

Packed fiber bed mist eliminators are devices designed for processing gases containing liquid mists and/or particulate matter. The gases impinge upon the fibers and the liquid and/or particulate matter are deposited upon the fibers. As liquid droplets build up on the fibers, they tend to run off (usually down) into a collection area or reservoir for removal. Some solid particles may run off with the liquid while liquid soluble particles tend to dissolve in the liquid. Usually the liquid contains water. Typically, sulfur dioxide is removed from gases such as combustion gases by an absorber or scrubber which can result in an ammonium sulfate mist in the gas.

Some particulate matter may become firmly attached to the fibers or become embedded onto the fiber bed. Such particulate deposits tend to plug the mist eliminators. Such deposits can be carbonaceous and/or inorganic and are mostly water insoluble.

Prior to the present invention, one method of cleaning the plugging materials from packed fiber bed mist eliminators was by removing individual mist eliminator elements from their containing vessels and manually washing them with water sprays. Alternatively, backflow systems or repeated filling of the vessels with water, followed by rapid draining has been tried to mechanically loosen and flush away the plugging contaminants. Large mist eliminators have been cleaned by maintenance personnel entering the vessel with high pressure water spray nozzles to individually wash mist eliminator elements in place by mechanically dislodging the plugging materials with a high pressure water spray.

In addition to the physical cleaning processes designed to dislodge plugging materials by the application of force there have been some attempts at chemical cleaning procedures. However, because of the materials of construction of the vessels and the fiber demisting elements, strong chemical treatments had to be avoided because of possible damage to the vessel or fiber elements. Accordingly, dilute chemical treatment such as dilute hydrochloric acid or dilute acidified sodium hypochlorite solutions have been tried with limited success.

The disadvantages of such prior art treatment procedures for cleaning fiber bed mist eliminators are excessive labor requirements; possible damage to the mist eliminator elements caused by the forces involved in physically dislodging the plugging materials; incomplete cleaning with backwash or similar flushing procedures; and excessive space required between fiber bed elements to provide access areas for maintenance personnel during cleaning.

An object of the present invention is to allow cleaning of the mist eliminator elements in situ regardless of vessel or element spacing or configuration without seriously attacking and degrading the fiber bed elements or vessel materials by employing a chemical soaking technique which also minimizes the labor requirements.

SUMMARY OF THE INVENTION

It has been discovered that the carbonaceous and other plugging materials in fiber containing mist eliminators employed to treat combustion gases (before or following sulfur dioxide recovery systems) can be dislodged and/or solubilized by a chemical treatment process comprising:

treating the fiber bed mist eliminators having plugging materials contained thereon with a hot acidified potassium permanganate solution;

removing the potassium permanganate solution from the mist eliminator (preferably by flushing with water); followed by treating the mist eliminator with gaseous sulfur dioxide, and removing the sulfur dioxide treated material with water.

DETAILED DESCRIPTION OF THE INVENTION AND THE PREFERRED EMBODIMENTS

Fiber containing mist eliminators such as packed fiber bed mist eliminators are well known especially in the chemical industry and are used to treat combustion flue gases before or following sulfur dixoide recovery to remove particulate matter from the flue gases. The use of mist eliminators has increased significantly in recent years mainly due to environmental protection considerations. Fiber containing mist eliminators function by exposing the flue gases to very large surface areas (fiber beds) in order to entrain or otherwise remove particulate matter contained in the flue gases.

The composition of the water-insoluble particulate matter deposited on the fiber beds of the mist eliminator is usually carbonaneous although many other ingredients can be present depending upon the characteristics of the fuels and other ingredients fed to the combustion process or which find their way into the combustion flue gas stream intentionally or otherwise.

Many chemical processes emit fine mists or finely divided soluble particulates as a part of their process. Packed fiber bed mist eliminators have been utilized for particulate control in these processes. For example they are used to control sulfuric acid mist from contact acid plants and to control ammonium sulfate fumes from sulfur dioxide recovery systems. In addition many chemical, pulp and papermaking processes burn side products or waste materials sometimes enriched with fossil fuels as part of their process usually to obtain the combustion value of the materials or to otherwise treat or dispose of the materials.

In the pulping industry, both the sulfite and kraft pulping processes produce materials that are suitable for treatment by combustion such as concentrated sulfite pulping residues obtained by concentrating spent sulfite pulping liquors which remain after separation of the pulp from the pulping liquor. Some materials are burned as part of a chemical recovery process, or as a means of obtaining fuel values or as a disposal method that avoids discharging the materials as a polluting liquid effluent. The gaseous products of combustion from such processes along with entrained particulate matter produced either in the boiler or in the sulfur dioxide recovery system following the boiler are referred to herein as combustion flue gases which can be treated by fibrous bed mist eliminators of the type cleaned by the process provided herein. In particular, the process is very suitable for cleaning mist eliminators used for treating flue gases obtained from combustion of concentrated sulfite pulping liquor.

Fiber containing mist eliminators are vessels through which combustion flue gases flow and which have fiber beds within the vessel designed for contacting the flue gas usually by the flue gas flowing through the fiber bed in a manner similar to a large filter.

Packed fiber bed mist eliminators are available commercially from companies such as: Monsanto Enviro-Chem Systems, Inc., as a Brink mist eliminator or as a Brink filter and from Clermont Engineering Company.

The fiber beds are usually made of glass fibers or other suitable material depending upon the nature of the flue gas being treated and the temperature of the flue gas.

Water-insoluble particulate matter becomes deposited on the fiber beds which increases the pressure drop across the device. When the pressure drop increases to an unacceptable level, the mist eliminator has to be cleaned by removing the particulate matter from the fiber beds.

The novel cleaning process for fiber bed mist eliminators having particulate matter deposited upon the fiber bed comprises the following steps:

1. Treating the fibrous beds with an aqueous potassium permanganate solution having a pH below 7, for a treatment time sufficient for reaction of the permanganate with the particulate matter. Preferably an elevated temperature is employed for the potassium permanganate treatment step, usually in excess of about 70° and up to about 220° F. The treatment time is usually several hours even at elevated temperatures of about 140° F. Preferably, the pH of less than 7 is obtained by adding sulfuric acid to the potassium permanganate solution. However, other acids are suitable such as nitric acid.

2. Following the acidified potassium permanganate treatment step, a flushing of the potassium permanganate solution is usually performed with water. The function of the flushing step is to substantially remove the potassium permanganate solution from the fiber bed mist eliminator. Alternatively, the potassium permanganate solution could be removed by draining or other suitable means;

3. Following the flushing step, the fiber bed is treated with gaseous sulfur dioxide. It is believed that the treatment with gaseous sulfur dioxide has the following effects: (1) solubilizes the manganese dioxide precipitates formed in the first step, (2) solubilizes any remaining acid-soluble particulate matter on the fiber bed; and (3) removes any particulate matter that might chemically react with the reducing agent.

In order for the gaseous sulfur dioxide treatment to solubilize and/or remove particulate matter it is necessary for a liquid to be present either during or after the treatment with sulfur dioxide. Preferably, the gases containing sulfur dioxide also are admixed with a water mist such as the exit gas obtained from a sulfur dioxide absorption scrubber which contains about 100 parts per million sulfur dioxide and an aqueous mist. It is particularly preferred to adjust the operation of the sulfur dioxide scrubber to permit increased quantities of sulfur dioxide in the exit gas to a level of from about 200 to about 400 parts per million $SO_2$ as shown in Example I herein.

Alternatively, a subsequent water treatment (e.g. washing, flushing or spraying) can be used after the $SO_2$ treatment to remove material from the fiber beds either by the material dissolving in the water or by becoming entrained or mixed with the water and exiting the vessel with the water.

A preferred sequence of treating flue gases containing sulfur dioxide is to first pass gases through a sulfur dioxide absorber or scrubber which lowers the $SO_2$ content to about 100 parts per million or lower and then pass the flue gases through a fiber bed mist eliminator. With such a flow path, the gaseous sulfur dioxide treatment step during the cleaning of a plugged mist eliminator can be easily accomplished by operating the sulfur dioxide absorber to provide exit gases from the absorber having about 200 to about 400 parts per million $SO_2$ (balance predominately $CO_2$ and $N_2$) along with a water mist so that the $SO_2$ treatment and the removal of $SO_2$ treated material can be accomplished simultaneous employing existing process gas streams and equipment. The following example discloses various preferred embodiments of the present invention. All proportions stated herein are by weight unless otherwise specified.

EXAMPLE I

Concentrated, ammonium sulfite pulping residues (about 50% solids) were continuously combusted in a power boiler. Then as part of the treatment of the combustion flue gases prior to being discharged into the atmosphere, the gases were passed through a sulfur dioxide absorber and then through a mist eliminator vessel containing glass fiber elements in order to remove particulate matter from the flue gases. The temperature of the flue gases entering the mist eliminator was about 75° F. The temperature of the gases leaving the device was about 75° F. After continuous operation of the mist eliminator for a prolonged period of time, the glass fiber beds became plugged with particulate matter. The vessel was then filled with an aqueous solution containing 2% $KMnO_4$ and 2% $H_2SO_4$ and held for three hours at 140°–160° F. The vessel was then drained, filled with water, drained, filled again with water and drained. Flue gases exiting a sulfur dioxide absorber employed to treat the flue gases for removing sulfur dioxide and which contained 200–300 ppm $SO_2$ along with water mist, were then passed through the vessel and through the mist eliminator elements. The pressure drop across the mist eliminator dropped steadily (indicating solubilization of the manganese dioxide) for about two hours until stabilizing at 14 in. $H_2O$, whereas the pressure drop prior to cleaning was 19 in. $H_2O$.

The gaseous sulfur dioxide can be admixed with other gases and when so mixed it should be present in a concentration of at least about 100 ppm. Concentrations higher than 100 ppm $SO_2$ tend to shorten the treatment time with $SO_2$ required to reduce the pressure drop to a desired level.

What is claimed is:

1. A process of cleaning fiber-containing apparatus having water-insoluble particulate material from the treatment of combustion flue gases deposited on the fibers, which process comprises;

treating the fibers and the particulate material with an aqueous, acidified potassium permanganate solution, removing the aqueous acidified potassium permanganate treatment solution, followed by treating the fibers and remaining particulate material with gaseous sulfur dioxide, and removing the sulfur dioxide treated material with water.

2. The process of claim 1, wherein the acidified aqueous potassium permanganate solution has a potassium permanganate concentration of from about 0.25% to a saturated solution at the treatment temperature for the potassium permanganate solution.

3. The process of claim 1, wherein the aqueous acidified potassium permanganate solution contains sufficient sulfuric acid to result in a pH of from about 0 to about 7.

4. The process of claim 1, wherein the elevated temperature for the acidified aqueous potassium permanganate treatment step is from about 70° to about 220° F and the pH from about 0 to about 6.

5. The process of claim 1, wherein the gaseous sulfur dioxide is contained in gases obtained from a sulfur dioxide absorber employed to treat said combustion flue gases for removal of sulfur dioxide.

6. The process of claim 5, where said combustion flue gases are obtained from the combustion of concentrated spent sulfite pulping liquors.

7. The process of claim 6, wherein the gases obtained from the sulfur dioxide absorber contain about 200 to about 400 parts per million sulfur dioxide along with entrained water whereby said treating with sulfur dioxide and said removing of sulfur dioxide treated material with water are performed simultaneously.

* * * * *